United States Patent
Kisker et al.

(10) Patent No.: US 10,661,614 B2
(45) Date of Patent: May 26, 2020

(54) APPARATUS FOR MEASURING THE PRESSURE OF A TWO-WHEELER TIRE, IN PARTICULAR, A BICYCLE TIRE

(71) Applicant: SKS metaplast Scheffer-Klute GmbH, Sundern (DE)

(72) Inventors: Davor Kisker, Hemer (DE); Michael Beste, Neuenrade (DE)

(73) Assignee: SKS Metaplast Scheffer-Klute GmbH, Sundern (DE)

( * ) Notice: Subject to any disclaimer, the term of this patent is extended or adjusted under 35 U.S.C. 154(b) by 0 days.

(21) Appl. No.: 16/206,271

(22) Filed: Nov. 30, 2018

(65) Prior Publication Data

US 2019/0160893 A1 May 30, 2019

(30) Foreign Application Priority Data

Nov. 30, 2017 (DE) .................. 10 2017 128 466

(51) Int. Cl.
*F16K 15/20* (2006.01)
*B60C 23/00* (2006.01)
*B60C 23/04* (2006.01)
*B60C 29/06* (2006.01)

(52) U.S. Cl.
CPC ........ *B60C 23/006* (2013.01); *B60C 23/0433* (2013.01); *B60C 23/0461* (2013.01); *B60C 23/0479* (2013.01); *B60C 23/0496* (2013.01); *B60C 29/06* (2013.01); *B60C 2200/12* (2013.01)

(58) Field of Classification Search
None
See application file for complete search history.

(56) References Cited

U.S. PATENT DOCUMENTS

| 2004/0055641 | A1* | 3/2004 | Ostrowiecki | ....... F16K 17/0413 137/223 |
| 2015/0110645 | A1* | 4/2015 | Wu | ........ F04B 33/005 417/63 |
| 2017/0254319 | A1* | 9/2017 | Wang | ........ F04B 33/00 |
| 2017/0368894 | A1* | 12/2017 | Kordes | ............ B60C 23/0479 |

FOREIGN PATENT DOCUMENTS

| DE | 102014220945 A1 | 4/2015 |
| JP | 2007-38993 A | 2/2007 |
| WO | 9636861 A1 | 11/1996 |
| WO | 2011053809 A1 | 5/2011 |

OTHER PUBLICATIONS

European Search Report in corresponding European Patent Application No. 18209373.2, dated Apr. 2, 2019, with English translation.

* cited by examiner

*Primary Examiner* — Brent Swarthout
(74) *Attorney, Agent, or Firm* — Edell, Shapiro & Finnan, LLC

(57) ABSTRACT

An apparatus for measuring the pressure of a two-wheeler tire comprises: an adapter component which comprises a joining mechanism to connect the apparatus to a valve of the two-wheeler tire; a valve opener to open the valve so that in a state connected to the valve pressurized air flows from the two-wheeler tire through the valve into the until the which can be connected to the adapter component; and a sensor component which can be connected to the adapter component. The sensor component comprises a pressure measurement device to measure the pressure in the apparatus and a transmitter to wirelessly transmit information corresponding to the measured pressure.

15 Claims, 4 Drawing Sheets

Fig. 1
Fig. 2
Fig. 3
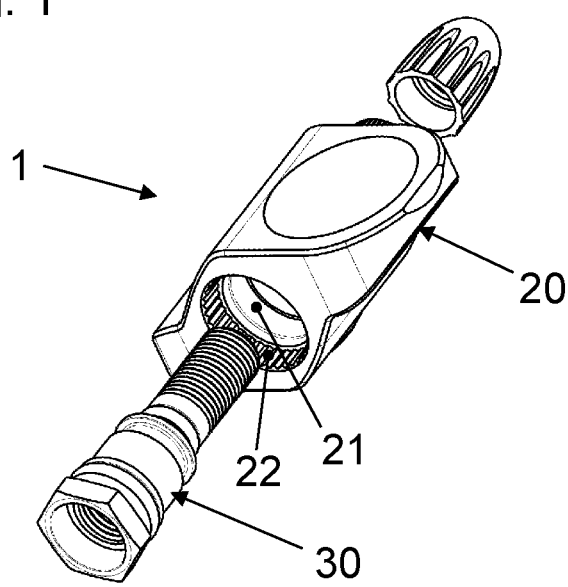
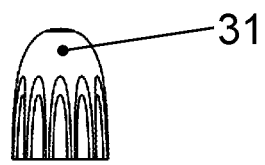
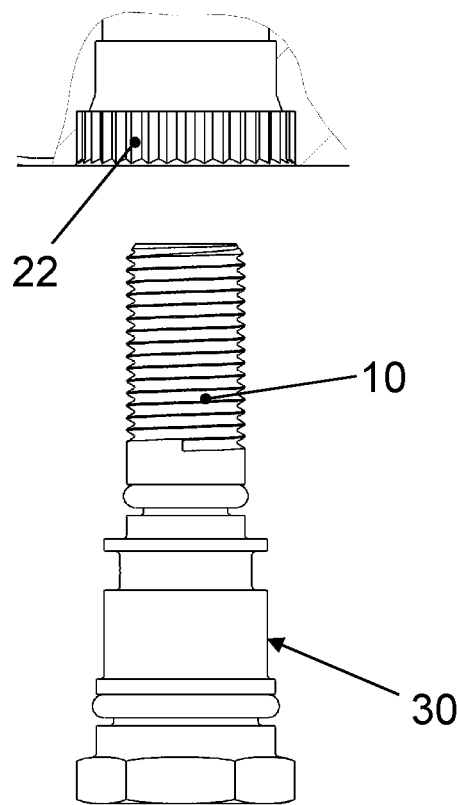
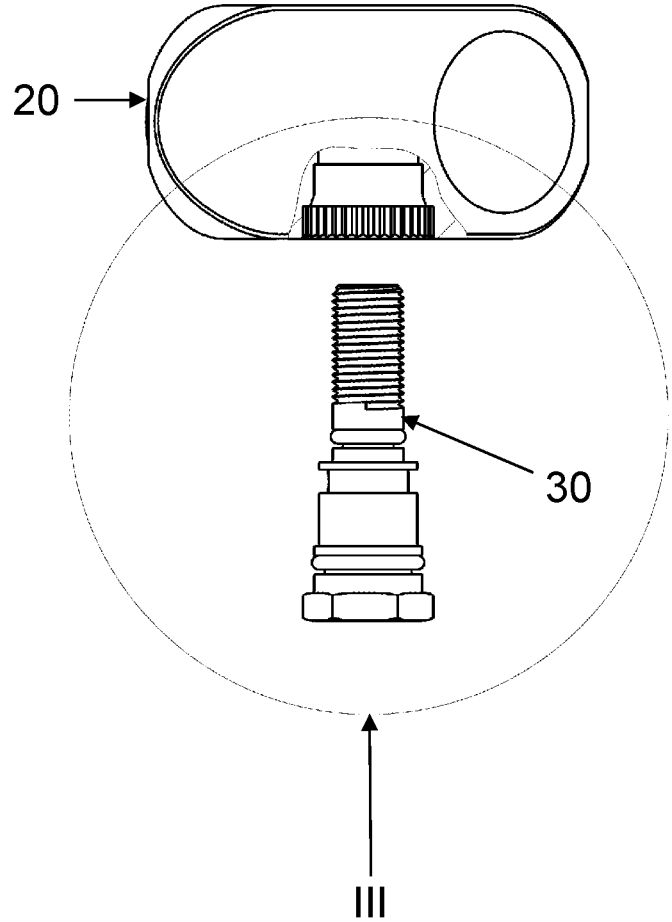

APPARATUS FOR MEASURING THE PRESSURE OF A TWO-WHEELER TIRE, IN PARTICULAR, A BICYCLE TIRE

TECHNICAL FIELD

The present invention relates to an apparatus for measuring the pressure of a two-wheeler tire, in particular, a bicycle tire. Furthermore, the present invention relates to a combination of such an apparatus with a mobile display and/or signaling unit.

BACKGROUND

It is known, for example, from U.S. Pat. No. 5,040,561 to use in motor vehicles tire valves that allow a radio transmission of information relating to the tire pressure to a control unit in the interior of the motor vehicle. As a result, it can be displayed or signaled to the driver of the motor vehicle whether there is a loss in pressure in the tire. The valve, known from the aforementioned US patent, is very large and complicated, so that it is not suitable for use on a bicycle and, in addition, cannot be retrofitted, in particular, to a bicycle. Furthermore, a built-in control unit that can process and display wirelessly transmitted information is not provided on a bicycle.

The problem, on which the present invention is based, is to provide an apparatus of the type that is mentioned in the introduction and by means of which information about the pressure of a tire can be transmitted in a two-wheeler, in particular, a bicycle, where in this case the objective is to use the apparatus with various valves in a particularly cost effective manner. Furthermore, the objective is to provide a combination of such an apparatus with a mobile display and/or signaling unit that can display or signal to the user information about the pressure of a tire.

SUMMARY

This objective is achieved, according to the present invention, by means of an apparatus exhibiting the features disclosed in claim 1 as well as a combination exhibiting the features disclosed in claim 14. The dependent claims relate to preferred embodiments of the invention.

According to an aspect of the present invention, the apparatus comprises: an adapter component, which comprises joining means for connecting the apparatus to the valve of the two-wheeler tire and means for opening the valve, so that in the state connected to the valve pressurized air flows from the two-wheeler tire through the valve into the apparatus, until the pressure in the apparatus corresponds to the pressure in the two-wheeler tire, a sensor component, which can be connected to the adapter component and which comprises pressure measuring means for measuring the pressure in the apparatus and transmission means for the wireless transmission of the information corresponding to the measured pressure.

When such an apparatus is used, there is no need to use a valve that is especially adapted for the transmission. Instead, the apparatus of the present invention can be connected to the valve of the tire, with the valve being already mounted on the two wheeler or, more specifically, the bicycle. As a result, there is the possibility of retrofitting any two wheeler or, more specifically, bicycle with such apparatuses.

Owing to the provision of a sensor component that is separate from the adapter component, one and the same sensor component can be used for different kinds of valves of a bicycle by using different adapter components. In particular, it can be provided that the sensor component can be connected to at least two different embodiments of adapter components, wherein, for example, a first embodiment of an adapter component is suitable for connecting to and for opening Schrader valves and/or Dunlop valves, whereas, for example, a second embodiment of an adapter component is suitable for connecting to and for opening Sclaverand valves. If the use of the apparatus with a bicycle with Schrader valves is provided, then the first embodiment of the adapter component is selected and connected to the sensor component. If the use of the apparatus with a bicycle with Sclaverand valves is provided, then the second embodiment of the adapter component is selected and connected to the sensor component.

There is the option that the sensor component surrounds the adapter component at least partially in the joined together state. In this case it can be provided that the sensor component can be connected to the adapter component in at least a first position and in at least a second position, in particular, in a plurality of different positions that differ from one another by the same angular distances. As a result, the sensor component can be suitably arranged between the spokes of the wheel.

There is the option that the apparatus comprises sealing means that seal off the sensor component and the adapter component relative to one another. In this way it is prevented that the air, issuing from the valve of the bicycle, leaves the apparatus.

It can be provided that the adapter component comprises a channel, through which the air, flowing out of the two-wheeler tire through the valve, can pass to the sensor component. As a result, it can be ensured that the pressure, measured in the sensor component, corresponds at least largely to the pressure in the two-wheeler tire.

There is the option that the joining means comprise an internal thread for a screwed connection of the apparatus to the valve. This results in a tight connection between the apparatus and the valve.

There is the option that the adapter component comprises connecting means for an air pump, so that the two-wheeler tire can be inflated with the air pump by means of the apparatus and the associated valve. As a result, the air pressure during inflation of the tire can also be displayed to the user, for example, on his smartphone. As a result, said user can have control over the air pressure in a targeted way.

For example, in this case the connecting means for the air pump can be arranged on the side of the adapter component that faces away from the joining means. Thus, the apparatus represents geometrically only an extension of the valve, so that the user can inflate the tire as usual.

It may be provided that the connecting means for the air pump are designed as a bicycle valve, in particular, as a Schrader valve and/or Sclaverand valve and/or Dunlop valve. Thus, the tire can be inflated by means of the apparatus with commercially available air pumps.

There is the option that the apparatus comprises fixing means, by means of which the sensor component can be placed securely on the adapter component. As a result, a safe operation of the apparatus can be ensured.

In particular, the fixing means can be designed as a nut that can be screwed on the connecting means for the air pump. Thus, the fixing means are similar to those, with which a valve can be fastened on the wheel of the two wheeler, so that the manipulation of the fixing means is familiar to the user.

It can be provided that the transmission means are radio transmission means. In particular, the transmission means may be suitable for radio transmission according to a Bluetooth standard. As a result, commercially available smartphones or tablet computers can be used as display and/or signaling units, wherein in this case said smartphones or tablet computers are, as a rule, all capable of processing information transmissions according to the Bluetooth standard.

It can be provided that the joining means are suitable for purposes of connecting to Schrader valves and/or Sclaverand valves and/or Dunlop valves. The means for opening the valve may also be suitable for opening bicycle valves, in particular, Schrader valves and/or Sclaverand valves and/or Dunlop valves. Thus, a correspondingly designed apparatus can be installed on most, preferably on all, commercially available bicycle valves.

According to another aspect, the combination comprises an apparatus according to the invention and a mobile display and/or signaling unit, wherein the display and/or signaling unit comprises transmission means for receiving the wirelessly transmitted information corresponding to the pressure and comprises display and/or signaling means for the display or signaling of the pressure or a pressure change. In particular, in this case the display and/or signaling unit can be a smartphone or a tablet computer.

BRIEF DESCRIPTION OF THE DRAWINGS

Other features and advantages of the present invention will become apparent from the following description of preferred exemplary embodiments with reference to the accompanying drawings. The drawings show in:

FIG. 1 is an enlarged perspective view of a first embodiment of an apparatus according to the present invention;

FIG. 2 is an enlarged, partially cut side view of the apparatus according to FIG. 1;

FIG. 3 is a view of a detail according to the arrow III in FIG. 2;

DETAILED DESCRIPTION

Figure 4:
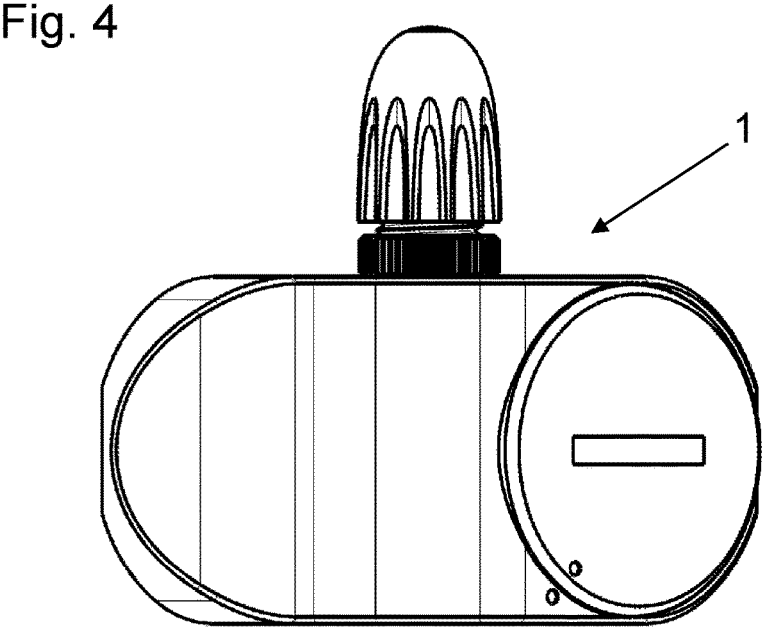
FIG. 4 is a side view of the apparatus according to FIG. 1 in the assembled state.

Identical or functionally identical parts are provided with the same reference numerals in the figures.

Figure 10:
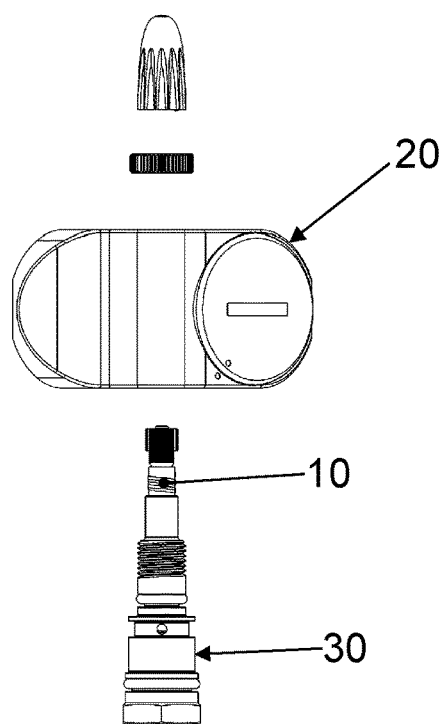
FIG. 10 is an enlarged, partially cut side view of a second embodiment of an apparatus according to the present invention with a bicycle valve designed as a Sclaverand valve.
Figure 11:
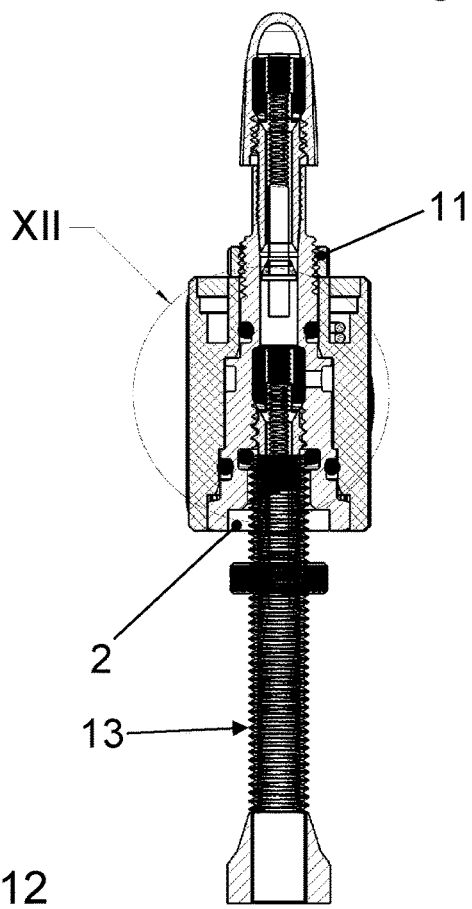
FIG. 11 is a sectional view of the apparatus according to FIG. 10 with the bicycle valve in the assembled state.
Figure 12:
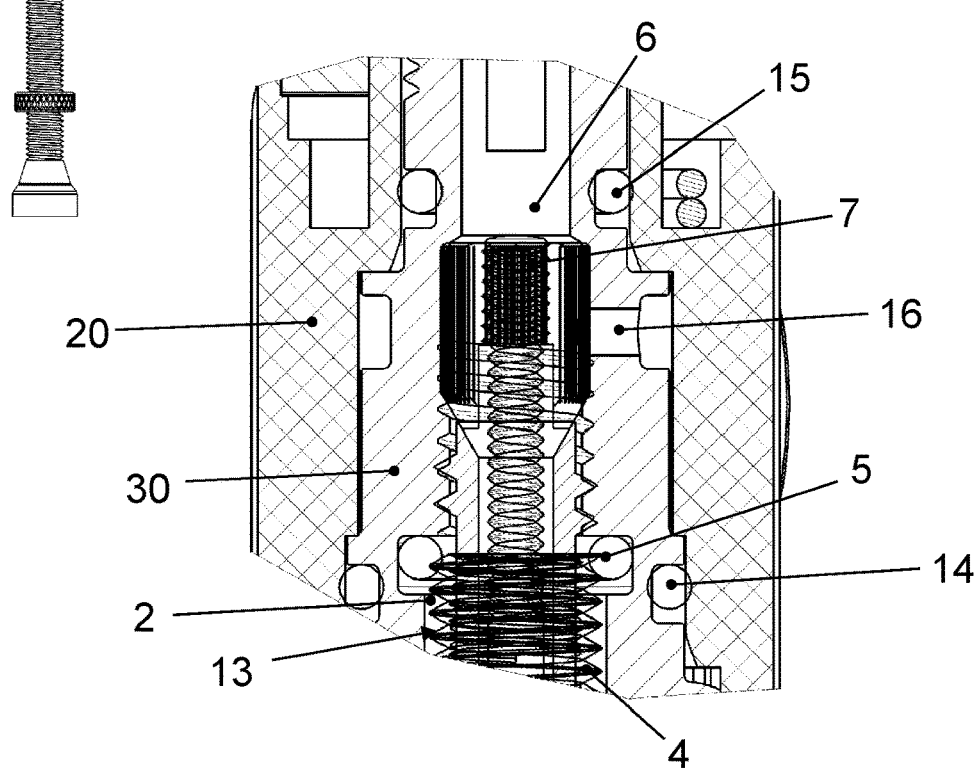
FIG. 12 is a view of a detail according to the arrow XII in FIG. 11.

The apparatus 1 of the present invention comprises a sensor component 20 and an adapter component 30, both of which can be connected to one another. The first embodiment of the adapter component 30 that can be seen in FIG. 1 to FIG. 9 is suitable for purposes of connecting to a valve 3 that is designed as a Schrader valve or as a Dunlop valve. The second embodiment of the adapter component 30 that can be seen in FIG. 10 to FIG. 12 is suitable for purposes of connecting to a valve 13 that is designed as a Sclaverand valve.

Figure 6:
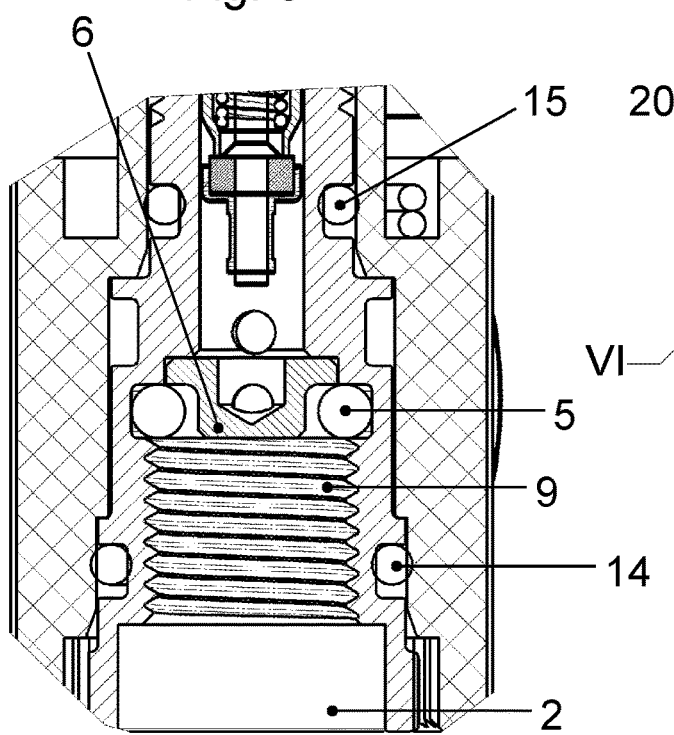
FIG. 6 is a view of a detail according to the arrow VI in FIG. 5.
Figure 7:
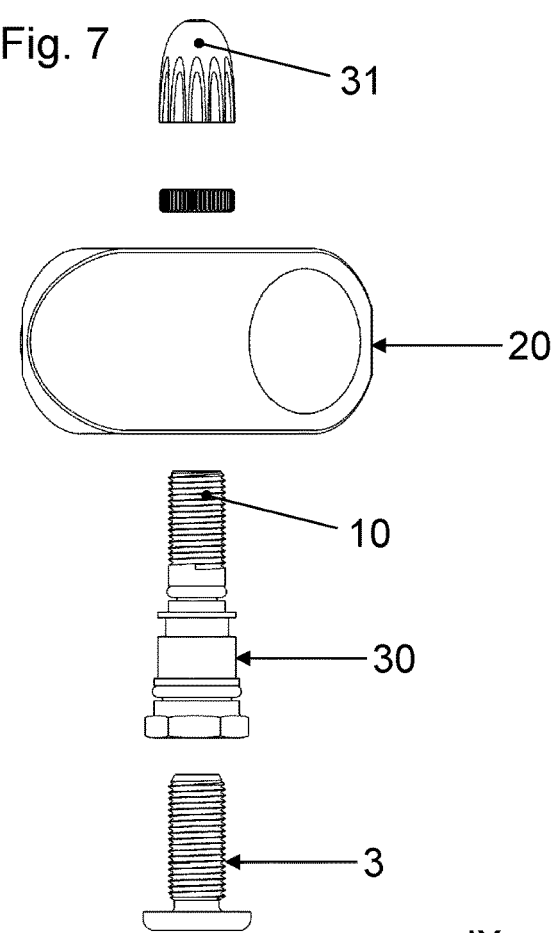
FIG. 7 is an enlarged, partially cut side view of the apparatus according to FIG. 1 with a bicycle valve designed as a Schrader valve.
Figure 8:
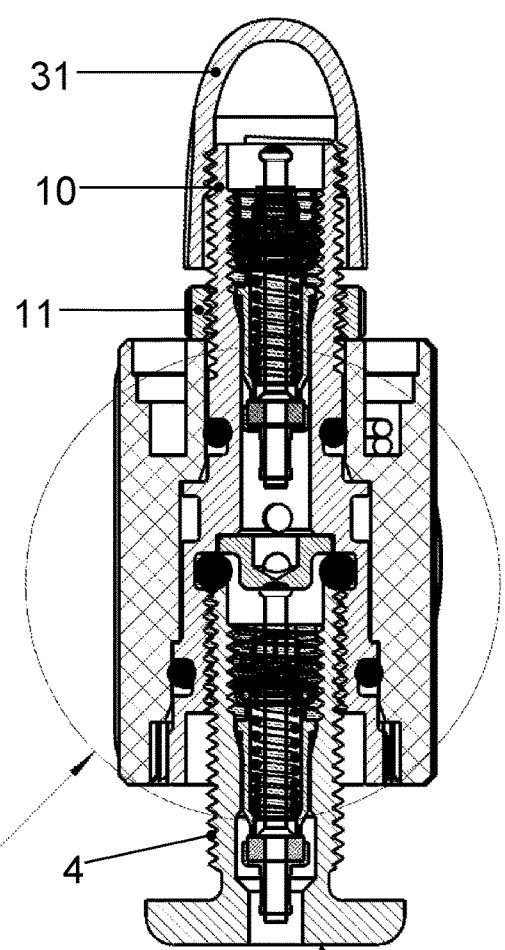
FIG. 8 is a sectional view of the apparatus according to FIG. 1 with the bicycle valve in the assembled state.

The adapter component 30 comprises a recess 2 on the bottom side in FIG. 6. Provided in the recess 2 is an internal thread 9 that can be screwed onto the external thread 4 of a valve 3 of a bicycle tire (see FIG. 9). The recess 2 with an internal thread 9 serves as a joining means for connecting to the valve 3.

Furthermore, sealing means 5 are provided in the recess 2 in the form of an O-ring, which may rest against the end face of a valve 3. Furthermore, in the illustrated first embodiment of the adapter component 30 a projection 6 is arranged in the recess 2; and said projection can press in a pin 7 that is provided in a valve 3 designed as a Schrader valve (see FIG. 9). By pressing in this pin 7, the valve 3 opens in a conventional manner. Thus, the projection 6 is used, in particular, together with the internal thread of the recess 2, as a means for opening the valve 3.

Thus, the first embodiment of the adapter component 30 is configured to interact with a Schrader valve. At the same time this first embodiment of the adapter component 30 is suitable for interacting with a Dunlop valve.

It is also certainly possible to create an embodiment of the adapter component that is configured only to interact with a Schrader valve and not to interact with a Dunlop valve. Then an embodiment that is configured to interact with a Dunlop valve could also be created.

In a second embodiment of the adapter component 30 a comparable projection 6 is provided, where in this case said projection can press in the pin 7, which is also provided in a Sclaverand valve, for purposes of opening the valve 13 (see FIG. 12).

Figure 5:
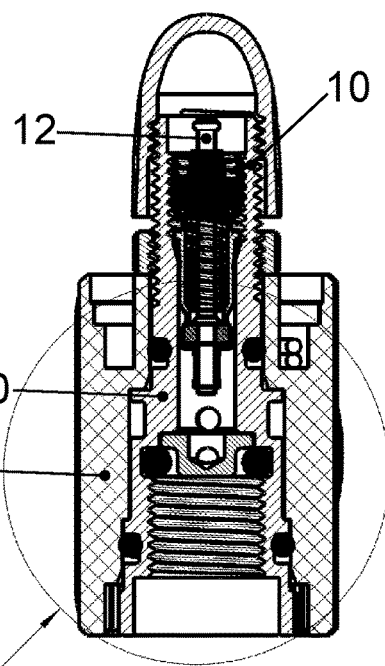
FIG. 5 is a sectional view of the apparatus according to FIG. 1 in the assembled state.

The sensor component 20 can be pushed onto the adapter component 30. For this purpose the sensor component 20 comprises a substantially hollow cylindrical receptacle 21 that is open on both sides (see FIG. 1). For example, FIG. 5 shows that the adapter component 30 can be inserted into the receptacle 21 in such a way that it terminates flush with the sensor component on the side facing the valve 3, 13 and protrudes from the sensor component 20 on the opposite upper side in FIG. 5.

On the side opposite the recess 2 the adapter component 30 comprises connecting means 10 for an air pump. In the connected state of the sensor component 20 and the adapter component 30, the connecting means 10 protrude upwards out of the sensor component 20 and are designed as a valve of a bicycle, in the exemplary embodiment shown in FIG. 1 to FIG. 9, in particular, as a Schrader valve (see FIG. 3, FIG. 5 and FIG. 8). This means that a pin 12 is provided in the interior of the connecting means 10, and that when said pin is pressed in, a fluid communication with the interior of the air pump can be produced.

It is absolutely possible to design the connecting means 10 in such a way that they are designed as a Sclaverand valve or a Dunlop valve. For example, in the embodiment according to FIG. 10 to FIG. 12, the connecting means 10 are designed as a Sclaverand valve.

The connecting means 10 are in fluid communication with the recess 2, so that the bicycle tire can be inflated with the air pump by means of the apparatus 1 or, more specifically, the adapter component 30 and the associated valve 3, 13. A cap 31, for example, a cap such as the kind that is also typically used in the adapted valve 3, 13, is screwed onto the connecting means 10 (see, for example, FIG. 7 and FIG. 8).

Figure 9:
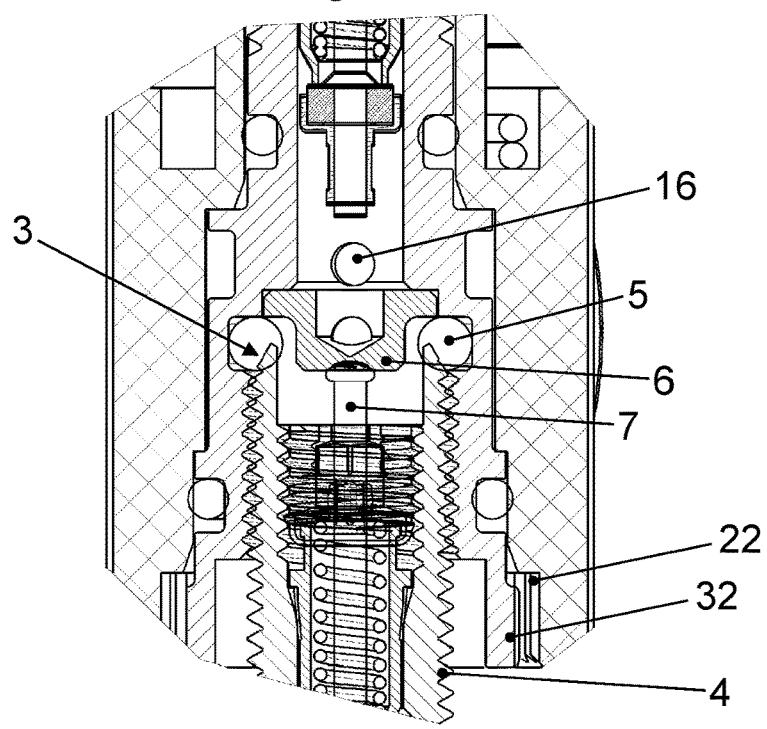
FIG. 9 is a view of a detail according to the arrow IX in FIG. 8.

The receptacle 21 of the sensor component 20 comprises an internal structuring 22 that interacts with a corresponding structuring 32 on the outer side of the adapter component 30 (see FIG. 1, FIG. 3 and FIG. 9). Through the engagement of the structurings 22, 32 it is ensured that the sensor component 20 can be mounted on the adapter component 30 only in predetermined positions. For example, the structurings can be designed in such a way that the angular distances between possible adjacent positions are about 10 degrees.

Furthermore, the apparatus 1 comprises fixing means 11 for placing the sensor component 20 securely on the adapter component 30 in the assembled state. The fixing means 11 are designed, in particular, as a nut and can be screwed onto the connecting means 10, until they abut the upper side of the sensor means 20 (see, for example, FIG. 2, FIG. 8 and FIG. 11).

Furthermore, the apparatus 1 comprises sealing means that seal off the sensor component 20 and the adapter component 30 relative to one another in the assembled state. The sealing means are designed as two O-rings 14, 15, which are at a distance from one another in the axial direction of the adapter component 30 and which are arranged circumferentially on the outer side of the adapter component 30 (see FIG. 6 and FIG. 12).

The inner side of the sensor component 20 rests against the O-rings 14, 15. Since the sensor component 20 has already been pushed onto the adapter component 30, the result is a comparatively tight connection between the sensor component 20 and the adapter component 30. Then said tight connection is secured by the fixing means 11.

Between the two O-rings 14, 15 a radial channel 16 extends from the recess 2 through the adapter component 30 on its outer side, so that the air, issuing from the valve 3, 13, can pass to the sensor component 20 (see for this purpose FIG. 9 and FIG. 12).

The sensor component 20 comprises pressure measuring means that are in fluid communication with the recess 2 by way of the radial channel 16. Thus, the pressure measuring means can measure the pressure in the recess 2. This pressure in the recess 2 corresponds to the pressure in the bicycle tire after the valve 3, 13 has been opened, so that the pressure measuring means can measure the pressure in the bicycle tire after the apparatus 1 has been connected to the valve 3, 13 in an appropriate way.

Furthermore, the sensor component 20 comprises transmission means that can transmit the information corresponding to the measured pressure wirelessly. In particular, it concerns radio transmission means that are suitable for a radio transmission according to a Bluetooth standard. The information about the amount of the pressure can be transmitted by the transmission means to, for example, a smartphone or a tablet computer, on which then the pressure can be displayed to the user; or in the event of a deviation from a target value the user can be signaled, for example, visually or acoustically that there is a deviation.

It is certainly possible to provide other transmission means that use a different transmission standard.

What is claimed is:

1. An apparatus for measuring the pressure of a two-wheeler tire, comprising:
    a first adapter component comprising a joining mechanism to connect the apparatus to a first type of valve of a two-wheeler tire and a valve opener to open the first type of valve so that, in a state connected to the first type of valve, pressurized air flows from the two-wheeler tire through the first type of valve into the apparatus until the pressure in the apparatus corresponds to the pressure in the two-wheeler tire;
    a second adapter component comprising a joining mechanism to connect the apparatus to a second type of valve of a two-wheeler tire and a valve opener to open the second type of valve so that, in a state connected to the second type of valve, pressurized air flows from the two-wheeler tire through the second type of valve into the apparatus until the pressure in the apparatus corresponds to the pressure in the two-wheeler tire; and
    a sensor component connectable to the first adapter component to connect the apparatus to the first type of valve and connectable to the second adapter component to connect the apparatus to the second type of valve in a manner that only one adapter component is connected to the sensor component at a time, the sensor component comprising a pressure measurement device to measure the pressure in the apparatus and a transmitter to wirelessly transmit information corresponding to the measured pressure.

2. The apparatus as claimed in claim 1, wherein the first adapter component is configured for connecting to and opening Schrader valves and/or Dunlop valves, and the second adapter component is configured for connecting to and opening Sclaverand valves.

3. The apparatus as claimed in claim 1, wherein the sensor component is configured to surround the first and second adapter components at least partially in a joined together state.

4. The apparatus as claimed in claim 1, wherein the sensor component is connectable to the first and second adapter components in at least a first position and in at least a second position.

5. The apparatus as claimed in claim 1, further comprising a seal to seal off the sensor component from the first and second adapter components.

6. The apparatus as claimed in claim 1, wherein the first and second adapter components each comprise a channel through which the air, flowing out of the two-wheeler tire through the valve, can pass to the sensor component.

7. The apparatus as claimed in claim 1, wherein the joining mechanism of the first adapter component and the joining mechanism of the second adapter component each comprise an internal thread for a screwed connection to the valve.

8. The apparatus as claimed in claim 1, wherein the first and second adapter components each comprise a connector to connect an air pump so that the two-wheeler tire can be inflated with the air pump via the apparatus and the associated valve.

9. The apparatus as claimed in claim 8, wherein the connector of the first adapter component and the connector of the second adapter component are arranged on a side of the respective adapter component that faces away from the joining mechanism.

10. The apparatus as claimed in claim 8, wherein the connector to connect the air pump is designed as a Schrader valve and/or Sclaverand valve and/or Dunlop valve.

11. The apparatus as claimed in claim 8, wherein the apparatus comprises a fastener to fasten the sensor component securely on the first and second adapter components.

12. The apparatus as claimed in claim 11, wherein the fastener comprises a nut to be screwed onto the connector that connects the air pump.

13. The apparatus as claimed in claim 1, wherein the transmitter is a radio transmitter suitable for a radio transmission according to a Bluetooth standard.

14. An assembly, comprising:
the apparatus of claim 1; and
a mobile unit comprising a communications device to receive the wirelessly transmitted information corresponding to the pressure and a display to display the pressure or a pressure change.

15. The assembly as claimed in claim 14, wherein the mobile unit is a smartphone or a tablet computer.

\* \* \* \* \*